United States Patent Office 2,980,197
Patented Apr. 18, 1961

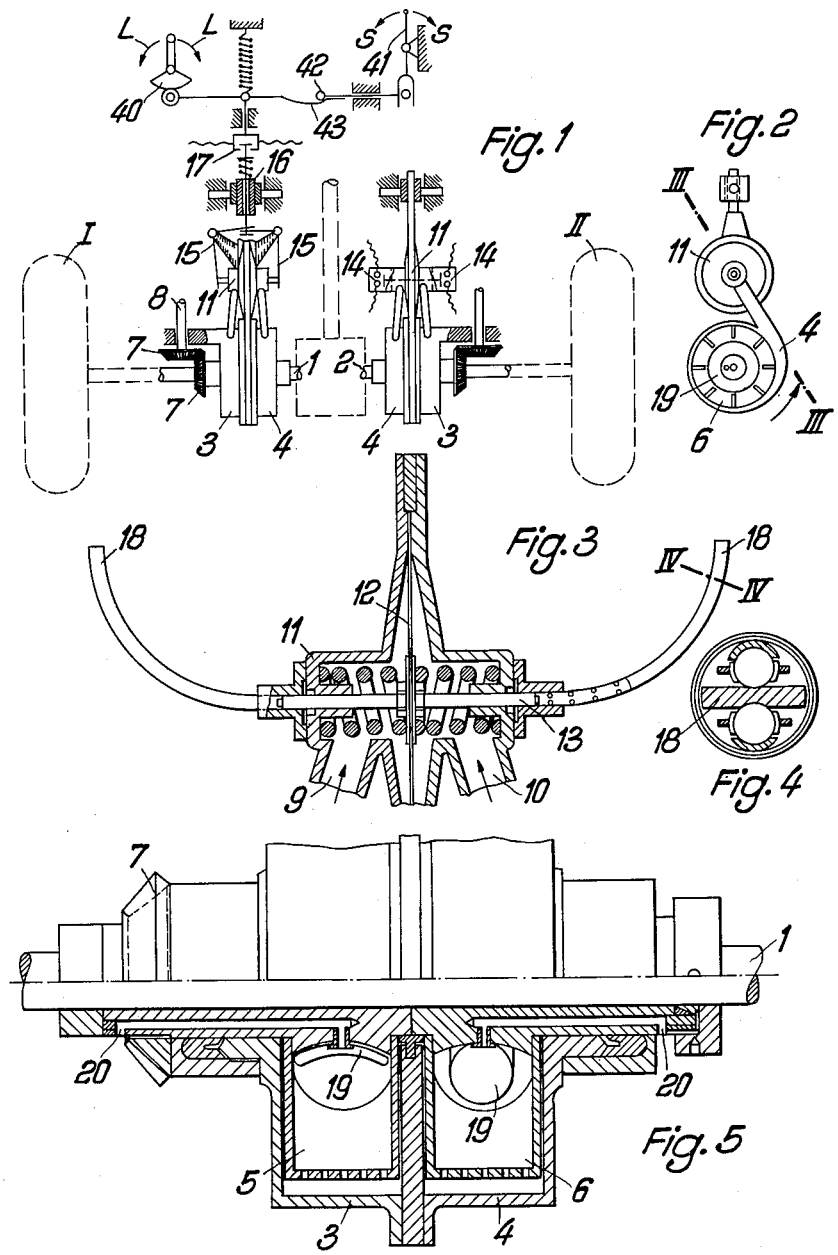

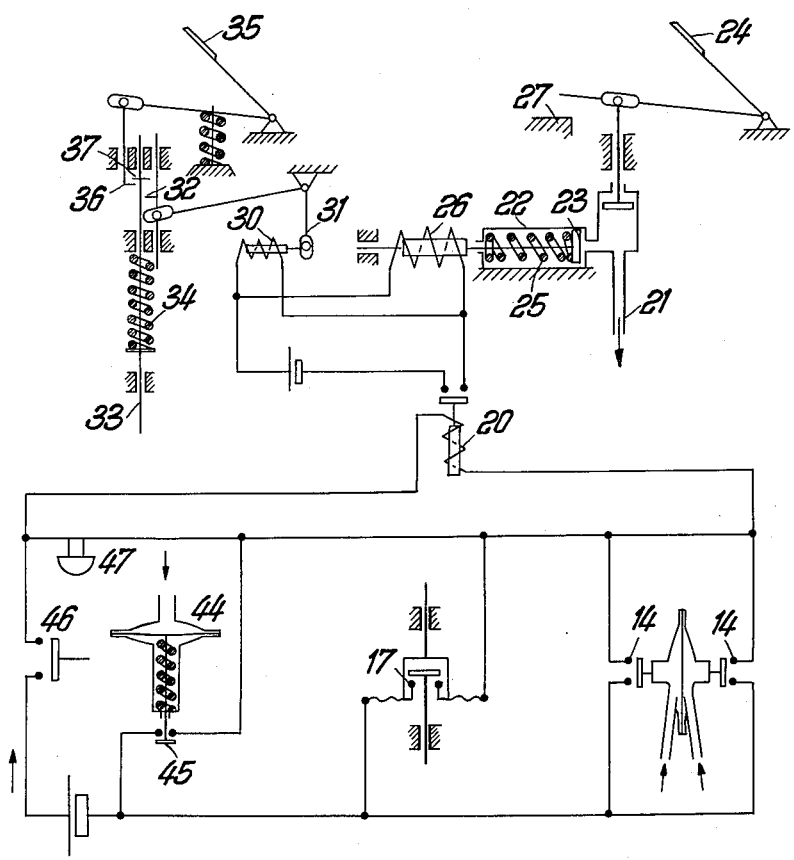

2,980,197

ARRANGEMENT FOR PREVENTING MOTOR VEHICLES FROM SKIDDING

Franz Breig, Ingo Breig, and Gunther Breig, all of 51 Buchener Weg, Lauenburg (Elbe), Germany Filed Feb. 18, 1959, Ser. No. 794,186

Claims priority, application Germany Feb. 20, 1958

12 Claims. (Cl. 180—82)

The invention relates to an arrangement for preventing the skidding of motor vehicles.

The main object of the invention is to reduce automatically the driving power and braking force of a motor vehicle when one or more of the wheels lose their grip on the road.

Another object of the invention is to indicate to the driver that there is a danger of skidding.

Yet another object of the invention is to reduce the engine power and braking force also when the deflection of the steering wheel is too great in relation to the speed of the vehicle when negotiating a curve.

Finally, another object of the invention is to make the responsiveness of the arrangement adjustable so that the actual conditions of the road (wet, icing) are taken into consideration.

The characteristic feature of an arrangement according to the invention consists of one or more devices automatically responding in the event of abnormal differences in the angular velocities of any two wheels of the vehicle. These devices are hereinafter briefly referred to as "regulators" and are constructed and arranged so that, in responding, they automatically actuate, independently of the driver, one or more devices for reducing or limiting the fuel feed and the braking force as long as the abnormal difference in the angular velocities is effective.

According to another suggestion of the invention, referring particularly to four-wheeled motor vehicles with two driven and two idle running wheels, two rotary pressure pumps can be arranged on each of the driven half-axles, one of which pumps is coupled with the half axle of the driven wheel and the other by means of bevel wheels and a flexible shaft or the like with the diagonally opposite idle running wheel of the vehicle, and the pressure chambers of both of these pressure pumps can act on a common movable wall in the form of a diaphragm or piston, the movement of which is dependent upon the difference in the pressures in the pressure chambers and is utilized to control the devices for influencing the engine power and the braking force.

Further details of the invention will be hereinafter described with reference to the accompanying drawings, in which Fig. 1 shows two driving half-axles with two driven wheels I, II of a four-wheeled vehicle and the relevant components of an arrangement according to the invention;

Fig. 2 shows a rotary pressure pump in side elevation;

Fig. 3 is a section on a larger scale taken on line III—III of Fig. 2;

Fig. 4 is a section taken on line IV—IV of Fig. 3;

Fig. 5 shows on a larger scale, partly in section, two pressure pumps arranged on a half-axle, and Fig. 6 is a diagram showing the devices for reducing or limiting the fuel feed and the braking power, as well as the electric circuit arrangements.

In Fig. 1, the two driving half-axles of a four-wheeled motor vehicle are designated by 1 and 2. Only the two driven wheels I and II of the vehicle are illustrated; the two idle running wheels have been omitted from the drawing. Two rotary pressure pumps in the form of centrifugal pumps 3 and 4 are arranged on each of the half-axles 1 and 2, the rotors of these pumps being designated by 5 and 6 respectively. In Fig. 5 the pair of pressure pumps on the left hand side is shown separately. The rotor 6 of the pressure pump 4 is connected with the driving half-axle 1 and driven thereby. The rotor 5 of the pressure pump is, on the other hand connected with the diagonally opposite idle running wheel of the vehicle (not shown) through the intermediary of bevel wheels 7 and a flexible shaft 8.

If there is a difference in the angular velocities of two diagonally opposite wheels of the vehicle, the rotors 5 and 6 of the two pressure pumps rotate at different speeds and produce different pressures in their pressure chambers. 19 are compensating bodies in the form of air-filled rubber tubes or the like, the internal space of which is in communication with the atmosphere through the passages 20. The two pressure chambers of the two pumps are connected each by a passage 9, 10 with the two halves of a pressure housing 11 which is transversely divided by a diaphragm 12. This diaphragm is then differently loaded by the two different pressures so that it can displace out of the centre towards the side of the chamber having the lower pressure.

This displacement movement can be utilized in various ways: either the rod 13 connected to the diaphragm closes one of the switch contacts 14 or a contact 17 through the intermediary of toggle levers 15 and a push rod 16, or it moves a flexible rod 18 (Fig. 3) which in turn actuates an electric contact substantially corresponding to the contact 17 but arranged at some other place. The above mentioned control contacts 14 and 17 can be constructed in known manner either as key switches or as quick-action switches. As can be seen from Fig. 6 they control a relay 20 which responds as soon as one of the contacts 17 or 14 is closed.

A switch cylinder 22 is connected up in the tube conduit system 21 of the braking mechanism and its piston 23 is pressed by a restoring spring 25 against the hydraulic liquid in the case of normal braking carried out by the driver with the aid of the brake lever 24. The spring 25 is somewhat stronger than the hydraulic force acting on the piston 23 which corresponds to the maximum permissible braking force, so that the piston normally stands in its extreme position at the right hand end of the cylinder 22. An electromagnet 26 is connected up in the circuit controlled by the relay 20 and, when this electromagnet is energized, it moves the piston 23 towards the left against the action of the spring 22, with the result that the oil space in the hydraulic system 21 is enlarged and the braking force correspondingly reduced. The movement of the brake lever 24 in the braking direction, which is effected by the driver, is limited by an abutment 27.

An electromagnet 30 is also located in the circuit controlled by the magnet 20 and, through the intermediary of a toggle lever 31, displaces a stop 32 which is situated in the path of the member 33 controlling the fuel feed. The member 33 is constructed as a rod which is pressed by a spring 34 in the direction in which the fuel feed becomes greater. On the depression of the driving pedal 35 a stop 36 moves downwards with the result that the member 33 with the counter-stop 37 mounted thereon also moves downward under the action of the spring 34. The stop 36, the position of which is, through the intermediary of the electromagnets 30, open or closed, limits only the downward movement of the member 33, that is it limits the possible increase in the fuel feed, or it even moves the member upwards, that is in the direction which brings the engine into the idle running or ticking-over position. The stop 32 acts independently of the position or movement of the control pedal 35 and, if necessary, renders this temporarily ineffective.

One of the command contacts, namely the contact 17, shown at the top on the left hand side of Fig. 1, is automatically adjustable through the intermediary of a suitably shaped cam segment 40 movable according to the deflection of the steering wheel, so that, in the case of a travelling speed which would be too high in relation to the steering wheel deflection, the contact 17 will close and the arrangement according to the invention brought into operation.

In addition the command contact 17 can be influenced by a hand lever 41 which can be adjusted at the will of the driver, and whose directions of adjustment are designated by S, namely so that the driver can set the response characteristic approximately to the actual slippery state of the road. It can readily be seen from the diagram that, when the hand lever 41 is shifted, the roller 42 will run on the suitably curved portion of the lever arm 43 with the result that an adjustment of the contacting condition on the contact 17 is effected. Thus, when the road conditions in general are very slippery, the arrangement will respond even at a slighter abnormality in the angular velocities of two wheels than need be the case under normal road conditions.

Another possible improvement consists in that an additional diaphragm 44 (Fig. 6) is connected up with the oil space of at least one of the pressure pumps 5, 6, which switch is closed independently of the command contacts otherwise present, when the vehicle is at a standstill or running at slow speed (up to about 25 m.p.h.) and only opens at higher speeds. This manner of operation can easily be attained when the diaphragm switch is connected up with the pressure space of one of the pumps. The main purpose of this diaphragm switch is that its contact 45 immediately causes the arrangement to respond when the wheel of the vehicle, with the pressure pump of which the switch is connected up, or all the wheels are suddenly to be blocked. By this additional diaphragm switch the arrangement according to the invention can also be caused to respond when there is no abnormality in the differences between the angular velocity of the wheels of the vehicle but all the wheels block.

Furthermore a cutout 46 coupled with the gear change lever (not shown) is arranged in the command circuit, by which cutout the electric circuit is positively broken when the gear box is in first speed and reverse and when the vehicle is standing still, so as to prevent the command switch 45 of the diaphragm switch 44 from causing the arrangement to respond at relatively low speeds.

Moreover, an electric signal device 47 may be provided which indicates to the driver that the arrangement has responded. This signal device can, for example, be an acoustic or optical signalling arrangement connected up in the command circuit.

The possibilities of the construction and application of the invention are not restricted to the examples and their details herein described and illustrated, many modifications being possible within the scope of the invention.

We claim:

1. In an arrangement for preventing the skidding of motor vehicles having four wheels, two of which are driven and two of which are idle, each of the two driven wheels being mounted on a half-axle, the improvement comprising two rotary pressure pumps mounted on each half-axle, each of said two rotary pressure pumps comprising a housing and a common movable wall therein to form therein two pressure chambers, one for each said rotary pressure pump, the movement of said movable wall being dependent upon the difference in pressure between said two pressure chambers, means directly coupling one of said pumps with the half-axle of one driven wheel so that the pressure in one of said pressure chambers is responsive thereto, means including bevel gears and a flexible shaft for connecting the other of said pumps with the idle running wheel directly opposite said driven wheel so that said other pressure chamber is responsive to said last-mentioned idle running wheel, the difference in pressure between said two pressure chambers being effective to move said movable wall, devices for limiting engine power and braking force and means operatively associated with said movable wall to control the devices for limiting the engine power and braking force in accordance with the movement of said movable wall.

2. In an arrangement according to claim 1, including an electric signalling device indicating to the driver that the arrangement has responded and is therefore in operation.

3. Arrangement according to claim 1, including a member controlling fuel feed, an adjustable stop operatively associated with said last-mentioned member and positioned in the path of movement thereof, said device for limiting engine power including an electromagnet, which, on responding adjusts said adjustable stop to limit or reduce the fuel feed.

4. Arrangement according to claim 1 having an hydraulic brake system, and including a piston and cylinder assembly operatively associated with the hydraulic brake system and communicating with the fluid space thereof, the face of said piston with said cylinder providing a cylinder space communicating with said fluid space, said device for limiting braking power comprising an electromagnet operatively coupled to said piston for enlarging said cylinder space when energized to reduce the braking effect of said hydraulic brake system.

5. Arrangement according to claim 1, including electromagnets for actuating said devices for limiting engine power and braking force, automatically responding devices each controlling two diagonally opposite wheels of the vehicle, command contacts operatively associated with said electromagnets for control thereof and connected with said automatically responding devices, and a cam segment movable according to the deflection of the steering wheel, at least one of said command contacts being operatively associated with said cam segment to adapt the responding characteristic automatically to the changed conditions when negotiating a curve, so that a response occurs when the speed of travel is too high in relation to steering wheel deflection.

6. Arrangement according to claim 5, including an adjustable hand lever and means operatively coupling said one command contact to said hand lever to adjust said one command contact for response to road conditions.

7. Arrangement according to claim 5, including a diaphragm switch operatively associated with one of said pumps, said switch being closed at vehicle speeds below 25 miles per hour and open at speeds above 25 per hour, means associated with said diaphragm switch and the wheel coupled to said one of said pressure pumps to operate said devices independently of said command contacts.

8. Arrangement according to claim 5 having gears and a gear change lever, including a cutout coupled to the gear change lever and coupled in circuit with said command contacts to interrupt the circuit when the engine is in first, reverse gear and when the vehicle is stationary.

9. Arrangement for preventing the skidding of a motor vehicle with an engine, a steering wheel, a gas pedal and having four wheels, two of which are driven and associated with hydraulic brakes and the other two are idle running wheels, comprising at least one magnetic switch, a member controlling fuel feed operatively coupled to said magnetic switch and responsive to the energization thereof to control the fuel feed independently of the gas pedal to reduce the quantity of fuel supplied to the engine and thereby the power thereof and to reduce the hydraulic pressure of the hydraulic brakes to release the same whereby to permit the driven wheels to grip the ground surface and prevent skidding, a circuit when rendered operative including a contact controlling said magnetic switch for energization thereof and a mechanism operatively coupled to the steering wheel and operative to render said circuit operative in accordance with the degree of rotation of the steering wheel and speed differential between any two of said four wheels.

10. Arrangement according to claim 9, including an articulated connection comprising a spring, a stop and a counter-stop associated with said spring, a fuel feed lever movable with said counter-stop, said articulated connection being arranged between said fuel feed lever and the gas pedal for controlling movement thereof, and a dragging and idling connection including a toggle lever and a stop arranged between said magnetic switch and said fuel feed lever to render said fuel feed lever inoperative upon energization of said magnetic switch.

11. Arrangement according to claim 9, including two wheel-speed difference switches, one of said wheel-speed difference switches being responsive to the difference in speed between one driven wheel and the idle running wheel diametrically opposite thereto and the other of said wheel-speed difference switches being responsive to the difference in speed between the other driven wheel and the idle running wheel diametrically opposite thereto.

12. Arrangement according to claim 9, including an adjustable hand lever, means coupling said hand lever to said contact for varying the period of response thereof including a roller and a cam guide therefor to render said contact responsive to road conditions, said lever having three positions of control to indicate a normal roadway, an especially dry roadway and a wet roadway, said lever varying the point of contact between said roller and said cam to alter the period of response of said contact.

References Cited in the file of this patent

UNITED STATES PATENTS

| | | |
|---|---|---|
| 1,893,833 | Apple | Jan. 10, 1933 |
| 2,132,914 | Fitch | Oct. 11, 1938 |
| 2,423,057 | Thomas et al. | June 24, 1947 |
| 2,869,687 | Keim et al. | Jan. 20, 1959 |

FOREIGN PATENTS

| | | |
|---|---|---|
| 821,809 | France | Sept. 6, 1937 |
| 874,639 | France | May 18, 1942 |